N. WHITE.
NUT LOCK.
APPLICATION FILED MAR. 20, 1911.

999,933.

Patented Aug. 8, 1911.

WITNESSES:
Albert Ward

INVENTOR
Noah White
BY
Robert H Young
Attorney

UNITED STATES PATENT OFFICE.

NOAH WHITE, OF DELTA, COLORADO.

NUT-LOCK.

999,933.  Specification of Letters Patent.  Patented Aug. 8, 1911.

Application filed March 20, 1911. Serial No. 615,653.

*To all whom it may concern:*

Be it known that I, NOAH WHITE, a citizen of the United States, residing at Delta, in the county of Delta and State of Colorado, have invented a new and useful Improvement in Nut-Locks, of which the following is a specification.

My invention relates to nut locks, and pertains more particularly to locking means for securing the wheel nuts on vehicles.

The object of my invention is to produce a lock secured upon the end of the axle or skein of a vehicle having a spring-pressed hinged finger projecting beyond the edge of the axle, and adapted to be held in engagement with notches on the nut screwed on the axle to prevent its accidental loosening, the said finger being also adapted to be raised out of such engagement when it is desired to unscrew the nut.

To these ends, my invention includes the combinations and arrangement of component parts to be hereinafter described and more particularly pointed out in the claims.

Figure 1:
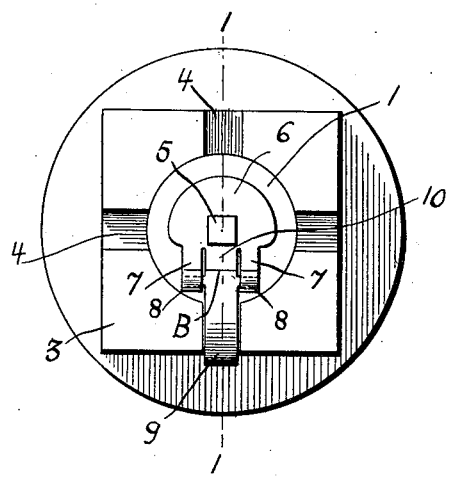
Figure 2:
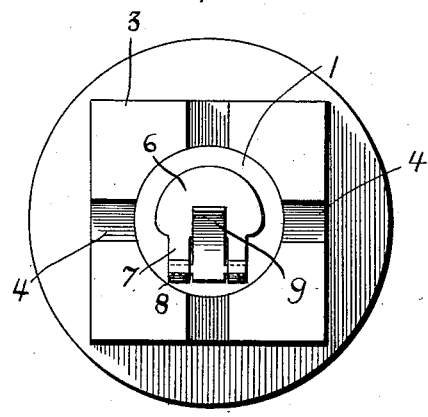
Figure 3:
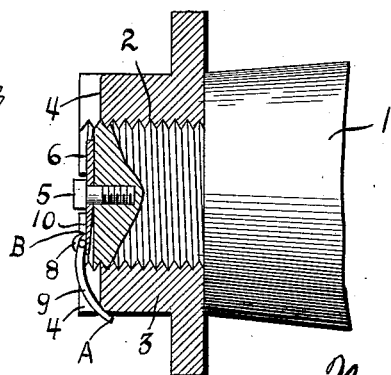

In the accompanying drawings, in which like reference characters indicate similar parts, Figure 1 is a face view of my invention showing the locking finger in engagement; Fig. 2 is a similar view showing the locking finger raised, and Fig. 3 is a sectional view thereof taken on the line 1—1 of Fig. 1.

My invention includes, generally, a metal plate secured upon the end of an axle or bolt, having laterally extending arms on the ends of which is hinged a curved finger adapted to project beyond the edge of the axle or bolt and engage notches on the nut secured on the axle or bolt, and a laterally projecting tongue on said plate between said arms adapted to bear upon the inner end of the pivoted finger and hold it in locking engagement with the nut.

Referring now to the drawings, 1 indicates an axle or bolt which is screw-threaded at 2 adjacent to its outer end on which is screwed the nut 3. The outer face of said nut is provided with a series of notches 4 to engage the locking finger 9 hereinafter described.

On the outer end of the axle 1 is secured by a screw or rivet 5 the nut lock of my invention, comprising a metal plate 6, which is provided with the two parallel laterally extending arms 7, on the ends of which are provided bearings 8 for the locking finger 9 hinged thereon. Said arms 7 are tempered sufficiently to possess a spring action to coact with the spring tongue 10 hereinafter described. The metal plate 6 is also provided with a laterally extending spring tongue 10, which like the arms 7 is integral therewith, between said arms adapted to bear upon the inner end of the locking finger 9 to hold it in engagement with the nut. Said tongue is tapered in thickness toward its end to provide a sufficient space between its inner face and the face of the end of the axle 1 for slight movement.

As shown in the drawings, the curved locking finger 9 is pivoted on the ends of the arms 7, and projects beyond the edge of the axle 1 at the outer end A to engage the notches 4 on the nut 2, and the opposite end B thereof, extends slightly beyond its povots to bear upon the spring tongue 10 by which the locking finger is held in locked or unlocked position.

It will be apparent that in operation the finger 9 may be raised to release or remove the nut 2, and that it may be lowered in the position shown in Fig. 1 of the drawings to engage the notches on the nut, and that it will be held therein by the pressure of the spring 10 on the inner end thereof.

It will be appreciated that the parts and combinations of my invention may be varied within a wide range from the specific exemplification thereof shown and described herein without departing from the spirit and scope of the invention, and that its use and utility is not limited to the character of axle and nut on which it is shown to be applied in this particular embodiment.

Having thus described my invention, what I claim as new and desire to be secured by Letters Patent is—

1. In a nut lock, the combination with a plate rigidly secured upon the end of an axle, of laterally extending parallel arms integral therewith having transverse bearings in their outer ends, a laterally extending spring tongue between said arms, a locking finger hinged on the ends of said arms intermediate of its ends, the outer end being adapted to engage a nut on the axle, the opposite end bearing upon said spring tongue and normally held thereby in such position, substantially as described.

2. In a nut lock, the combination with a plate rigidly secured upon the end of an axle, and a nut having a plurality of notches on its outer face secured on the axle, of laterally extending parallel spring arms integral with said plate having transverse bearings on their outer ends, a laterally extending tapered spring tongue integral with said plate between said arms, a curved finger hinged in the bearings on the ends of said arms, intermediate of its ends, the outer end being adapted to engage the notches on said nut, and the opposite end bearing upon said spring tongue and normally held thereby in such position, substantially as described.

NOAH WHITE.

Witnesses:
C. A. MERRILL,
KARL H. KOBER.

Copies of this patent may be obtained for five cents each, by addressing the "Commissioner of Patents, Washington, D. C."